United States Patent [19]

Palma

[11] 4,151,652

[45] May 1, 1979

[54] GAUGE FOR DIRECTLY MEASURING CHAIN WEAR

[75] Inventor: Milton J. Palma, Pekin, Ill.

[73] Assignee: Caterpillar Tractor Co., Peoria, Ill.

[21] Appl. No.: 886,184

[22] Filed: Mar. 13, 1978

[51] Int. Cl.² .............................................. G01B 3/20
[52] U.S. Cl. .................................................. 33/143 M
[58] Field of Search ......... 33/143 M, 143 R, 180 AT, 33/158, 143 J, 143 K

[56] References Cited

U.S. PATENT DOCUMENTS 3,169,700  2/1965  Healy .................................. 33/143 M

*Primary Examiner*—Richard E. Aegerter
*Assistant Examiner*—Willis Little
*Attorney, Agent, or Firm*—John L. James

[57] ABSTRACT

A gauge is provided for directly measuring wear of a chain as a function of chain pitch. The gauge measures chain pitch where pitch is unknown and indicates chain wear for a given pitch in percentage of chain elongation due to wear. The gauge is color coded for easy reading.

10 Claims, 4 Drawing Figures

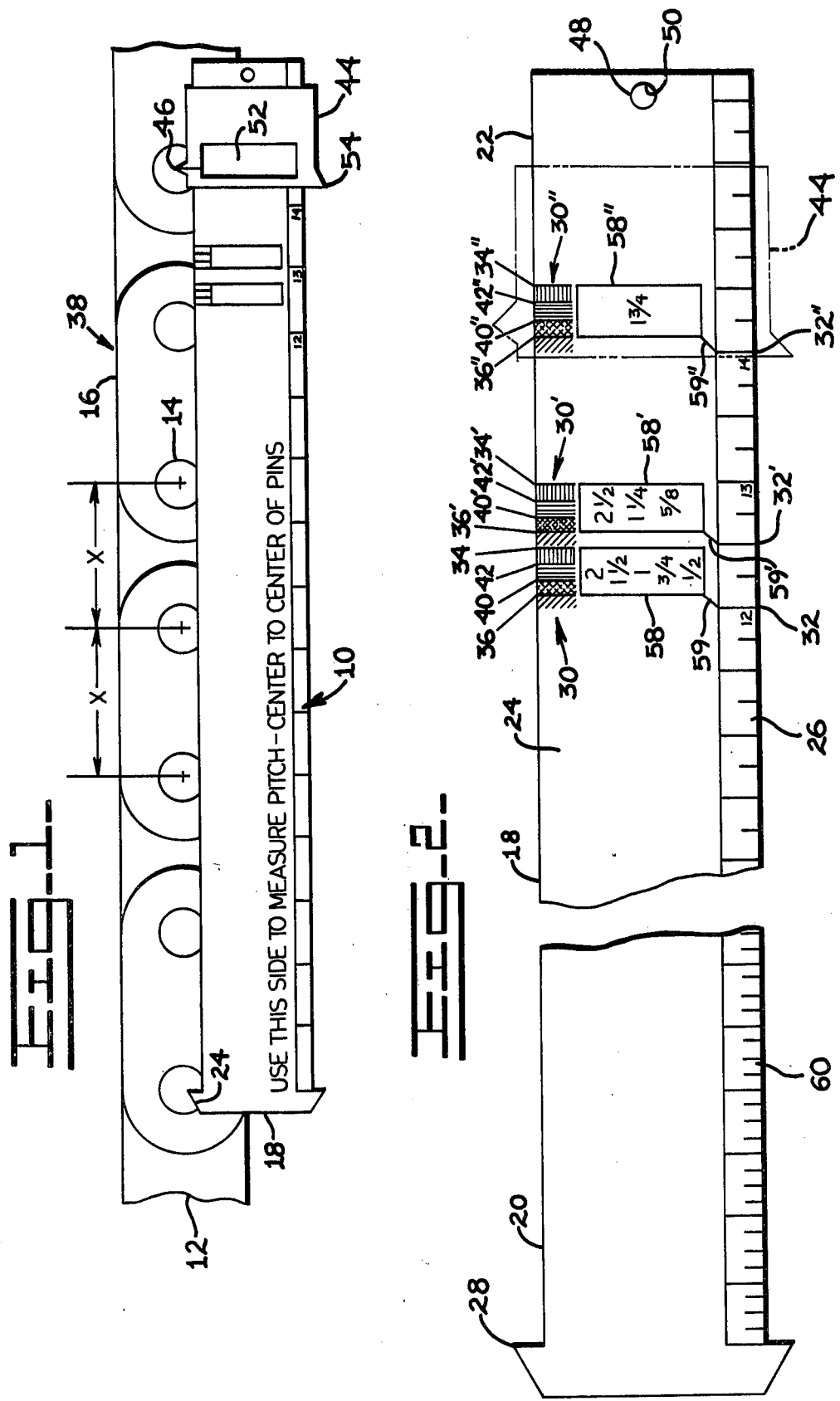

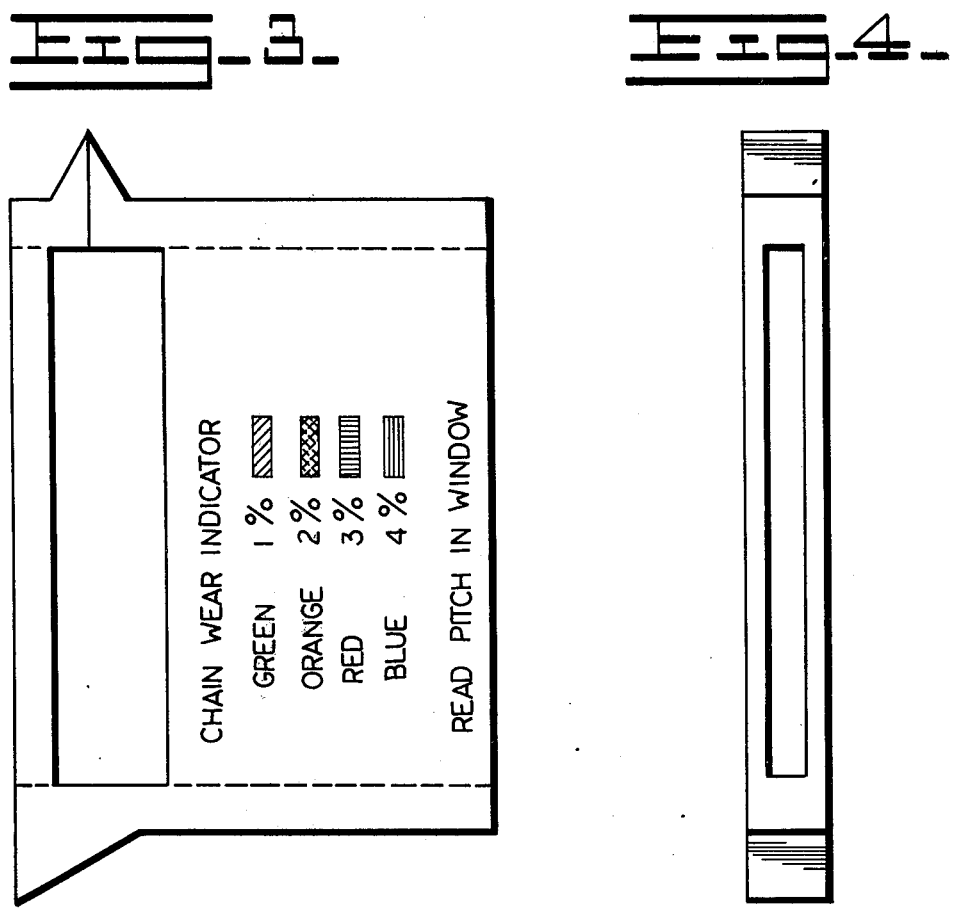

GAUGE FOR DIRECTLY MEASURING CHAIN WEAR

BACKGROUND OF THE INVENTION

Chains consisting of a number of interconnected links and pins have a tendency to wear during normal use. Wear is retarded by hardening the contact surfaces of the links and pins which rub against one another during pivotal movement of the links about the pins. As the chain wears it elongates and when the hardened contact surfaces are worn away, the chain is sometimes subject to failure during use. A gauge is used for measuring chain wear as a regular part of a chain inspection to indicate when the chain is worn sufficiently to require repair or replacement.

Current gauges are capable of indicating when a chain is worn severely enough to warrant replacement but do not accurately indicate the service remaining before replacement is required. It is desirable to know the amount of chain wear so that the useful chain life remaining can be determined and subsequent servicing of the chain can be scheduled.

Chain wear gauges are not always simple to read or understand and sometimes calculations are required to determine the amount of wear. It is desirable to have a chain wear gauge which is easy to read and understand at a glance without tedious calculation.

Some gauges are only useful for measuring chain wear of chains having only one of several series of chain pitch thus requiring a different gauge for each series of chain pitch. It is desirable to have a single gauge for measuring chain wear for several series of chain pitch.

SUMMARY OF THE INVENTION

The present invention is directed to overcoming one or more of the problems as set forth above.

According to the present invention, a gauge directly measures wear of a chain as a function of chain pitch. A single gauge measures wear of chains for several different series of chain pitch. The gauge is easy to read and does not require tedious calculations.

BRIEF DESCRIPTION OF THE DRAWINGS

FIG. 1 is a diagrammatic front view of a wear gauge;
FIG. 2 is an enlarged front view similar to FIG. 1;
FIG. 3 is an enlarged front view of a portion of the wear gauge of FIG. 1; and
FIG. 4 is a right side view of FIG. 3.

DETAILED DESCRIPTION

Referring to FIG. 1, a gauge 10 for directly measuring wear of a chain 12 as a function of the pitch of the chain 12 is shown in position for measuring wear of the chain 12. The chain pitch is the distance, denoted "X", between the centers of adjacent pins 14 which connect links 16 to form the chain 12.

Referring to FIG. 2, the gauge 10 has a body member 18 with first and second end portions 20,22 and top and bottom side portions 24,26. The bottom side 26 is used for measuring pitch and both sides 24,26 are used for measuring wear.

A first indicator 28 is positioned on the first end portion 20 and is alignable with the center of one of the chain pins 14. The first indicator 28 is preferably pointed with a point extending beyond each of the top and bottom sides 24,26. The first indicator 28 can have a line extending perpendicularly between the top and bottom sides 24,26 instead of being pointed.

A scale 30 which has first, second and third gradations 32,34,36 is located on the second end portion 22 at a location sufficient for placing the first gradation 32 as preselected distance from the first indicator 28, preferably substantially equal to an integer multiple of the chain pitch for a new chain 12. The first gradation 32 is preferably located on the bottom side 26 with the remaining gradations located on the top side 24.

New chains 12 are manufactured with standard unit pitches of ½, ¾, 1, 1½, 2; ⅝, 1¼, 2½; and 1¾; thus the first gradation is located an integer multiple of one of the standard pitches from the first indicator 28. Where the unit pitch is ½, ¾, 1, 1½ or 2, the unit distance between the first gradation 32 and first indicator 28 is 12; where the pitch is ⅝, 1¼ or 2½, the distance is 25 or more preferably 12½; and where the pitch is 1¾ the distance is 14. By this construction the distance between the first and second end portions 20,22 is shortened by approximately 12½ units thereby saving materials and energy while preserving the accuracy of the measurements.

Referring to FIG. 2, the first gradation 32 is located 12 units from the first indicator 28 for use with chain pitches of which 12 is an integer multiple such as pitches of ½, ¾, 1, 1½ and 2. First gradations for pitches of ⅝, 1¼ and 2½ and 1¾ are designated by "'" and "''" numbers respectively and differ from the first gradation 32 only by location. The other gradations are likewise designated by "'" and "''" numbers.

The second gradations 34,34',34" are spaced an incremental distance from the first gradation 32,32',32" equal to the elongation of a multiple portion 38 of chain 12, which is the portion between the first indicator 28 and first gradation 32,32',32", when worn sufficiently to warrant replacement. The third gradation 36,36',36" lies between the first and second gradation 32,32',32" and 34,34',34" at a location indicating chain wear of approximately 1%.

Fourth and fifth gradations 40,40',40" and 42,42',42" lie between the second and third gradation 34,34',34" and 36,36',36" at locations indicating chain wear of approximately 2% and 3% respectively. Thus the first, second, third, fourth and fifth gradations indicate chain wear of approximately 0%, 4%, 1%, 2% and 3%, respectively.

The area between adjacent gradations is preferably color coded to facilitate measuring. The area between the first and third gradations 32,32',32" and 36,36',36" is colored green indicating wear of less than 1%. The area between the third and fourth gradations 36,36',36" and 40,40',40" is colored orange indicating wear of 1–2%. The area between the fourth and fifth gradations 40,40',40" and 42,42',42" is colored red to indicate wear of 2–3% and the desirability of repairing or replacing the chain 12. The area between the fifth and second gradations 42,42',42" and 34,34',34" is colored blue to indicate wear of 3–4% and that repair or replacement is highly desirable.

Referring to FIGS. 1–4, the gauge 10 has a cursor 44 movably positioned on the body member 18. The cursor 44 has a second indicator 46 and is movable along the body member 18 to a position at which the cursor indicator 46 is substantially aligned with the center of one of the chain pins 14 and lies between the first and second gradations 32,32',32" and 34,34',34", the exact location depending upon the amount of chain wear.

The body member 18 fits inside the cursor 44 and has rivet 48, or the like, embedded in the second end portion 22 to prevent the cursor 44 from sliding off the body member 18. The first indicator 28 prevents the cursor 44 from sliding off the first end portion 20. The rivet 48 preferably has an opening 50 for storing the gauge 10 when not in use.

The cursor 44 has a window 52 and a pointer 54 which is alignable with the first gradation 32,32',32". The cursor 44 has a legend 56 translating the color coded areas to between the gradations to percentages of chain wear.

The body member 18 has a listing of chain pitches 58,58',58" in the area of the scale 30,30',30" with which the scale is useable. The listing 58,58' or 58" is visible in the window 52 when the pointer 54 is aligned with the first gradation 32,32' or 32". The pitch listing 58,58',58" indicates the first gradation 32,32',32" with which the pitch scale is useable, preferably by a line 59,59',59" connecting the pitch scale 58,58',58" with the first gradation 32,32',32".

The body member 18 also has a pitch scale 60 for measuring pitch. The pitch scale 60 is located on the bottom side 26 of the body member 18 and contains the first gradation 32,32',32".

In operation, a person must first determine the pitch of the chain 12 if it is unknown. Pitch is determined by using the pitch scale 60. The first indicator 28 is aligned with the center of a chain pin 14 and the cursor 44 is moved to align the pointer 54 with the center of another pin 14. The pitch scale 60 is read below the pointer 54 and the distance divided by the number of links 16 between the pointer 54 and first indicator 28. The measurement is checked by measuring pitch for a single link 16.

Once pitch is determined, the pitch listing 58,58', 58" consulted to find the first gradation 32,32',32". The first indicator 28 is aligned with the center of a pin 14 and the cursor indicator 46 is aligned with the center of another pin 14 and simultaneously positioned between the first and second gradations 32,32',32" and 34,34',34". The cursor indicator 46 is now aligned with one of the color coded areas and the cursor legend 56 can be consulted to see what the percentage of chain wear.

Where the cursor indicator 46 is simultaneously aligned with a pin center and positioned between the first and second gradations an alternate method can be used. The alternate method is to align the pointer 54 with the first gradation 32,32', or 32", then move the cursor indicator 46 to the nearest pin center to the right. If the cursor indicator 46 lies between the first and second gradations, the measurement is made; if not, the chain wear is greater than 4% and should be replaced.

Thus, the gauge 10 measures chain wear at a glance without tedious calculations. The gauge 10 is useful for all chains having standard pitches and eliminates the need to have several gauges 10 for measuring chain wear.

The Embodiments of the Invention in which an Exclusive Property or Privilege is Claimed are Defined as Follows:

1. A gauge for directly measuring wear of a chain as a function of chain pitch, comprising:
   a body member having first and second end portions;
   a first indicator being positioned on the first end portion and alignable with a first preselected point on the chain;
   a scale having at least first, second, and third gradations and being positioned on the second end portion at a location sufficient for placing the first gradation a preselected distance from the first indicator substantially equal to an integer multiple of the pitch of the new chain, said second gradation being spaced an incremental distance from the first gradation equal to the elongation of the multiple portion of the chain when worn a preselected amount, said third gradation lying between the first and second gradations; and
   a cursor having an indicator and being movable along the body member to a position at which the cursor indicator is aligned with a second preselected point on the chain, said second preselected point being spaced from the first point a distance substantially equal to an integer multiple of the average pitch of the worn chain, said cursor indicator and scale being positioned one relative to the other at a location sufficient for automatically selecting the one of said second and third gradations corresponding to the increase in the pitch of the worn chain in response to moving said cursor along the body member to the second preselected position.

2. A gauge, as set forth in claim 1, including fourth and fifth gradations, said third, fourth and fifth gradations being positioned between the first and second gradations at points indicating chain wear of approximately 1%, 2% and 3% respectively.

3. A wear gauge, as set forth in claim 2, wherein the area between adjacent gradations is color coded.

4. A wear gauge, as set forth in claim 3, wherein the cursor is imprinted with a legend translating the color coded gradations to percentage wear.

5. A wear gauge, as set forth in claim 1, wherein the unit distance between the first indicator and first gradation is twelve units.

6. A wear gauge, as set forth in claim 1, wherein the unit distance between the first indicator and first gradation is twelve and one-half units.

7. A wear gauge, as set forth in claim 1, wherein the unit distance between the first indicator and first gradation is fourteen units.

8. A wear gauge, as set forth in claim 1, including second and third scales each having a first gradation, the unit distance between the first indicator and first gradation of the first, second and third scales being twelve, twelve and one-half, and fourteen units, respectively.

9. A wear gauge, as set forth in claim 8, wherein each of said scales includes a listing of chain pitches with which the scale is useable.

10. A wear gauge, as set forth in claim 9, wherein the body member has a scale for measuring chain pitch, and wherein the cursor has a window and a pointer, a selected one of said listings of chain pitches being visible in the window when the pointer points to the first gradation of the respective scale.

* * * * *